(12) United States Patent
Monereau et al.

(10) Patent No.: US 8,388,734 B2
(45) Date of Patent: Mar. 5, 2013

(54) DUST-LADEN WET GAS TREATMENT

(75) Inventors: Christian Monereau, Paris (FR);
Arthur Darde, Paris (FR); Anne Berthelemot, Paris (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 241 days.

(21) Appl. No.: 12/999,169

(22) PCT Filed: Jun. 15, 2009

(86) PCT No.: PCT/FR2009/051130
§ 371 (c)(1),
(2), (4) Date: Dec. 15, 2010

(87) PCT Pub. No.: WO2010/001038
PCT Pub. Date: Jan. 7, 2010

(65) Prior Publication Data
US 2011/0088551 A1    Apr. 21, 2011

(30) Foreign Application Priority Data
Jul. 3, 2008 (FR) .................... 08 54527

(51) Int. Cl.
*B01D 53/047* (2006.01)
*B01D 53/26* (2006.01)

(52) U.S. Cl. ................. 95/96; 95/117; 95/139

(58) Field of Classification Search ........... 95/96, 116, 95/117, 129, 130, 137–141, 143; 423/230, 423/215.5
See application file for complete search history.

(56) References Cited

U.S. PATENT DOCUMENTS

| | | | |
|---|---|---|---|
| 3,913,253 A * | 10/1975 | Juntgen et al. | 423/244.03 |
| 4,077,779 A | 3/1978 | Sircar et al. | |
| 4,833,877 A * | 5/1989 | Ahland et al. | 60/781 |
| 4,840,647 A | 6/1989 | Hay | |
| 5,464,604 A * | 11/1995 | Suehiro et al. | 423/570 |
| 6,287,366 B1 | 9/2001 | Derive et al. | |
| 6,315,818 B1 | 11/2001 | Monereau | |
| 6,517,609 B1 | 2/2003 | Monereau et al. | |
| 7,857,889 B2 * | 12/2010 | Morf | 95/13 |
| 2007/0232706 A1 | 10/2007 | Shah et al. | |
| 2007/0261551 A1 | 11/2007 | Sawada et al. | |

FOREIGN PATENT DOCUMENTS

| | | |
|---|---|---|
| EP | 0305919 | 3/1989 |
| EP | 0341879 | 11/1989 |
| EP | 1004343 | 5/2000 |

(Continued)

OTHER PUBLICATIONS

International Search Report for PCT/FR2009/051130, mailed Dec. 2009.

(Continued)

*Primary Examiner* — Frank Lawrence, Jr.
(74) *Attorney, Agent, or Firm* — Elwood L. Haynes

(57) ABSTRACT

A method for producing a $CO_2$-enriched gas from a feed gas comprising carbon dioxide ($CO_2$), at least one component selected from $H_2$, $N_2$, $CH_4$, CO, $O_2$ and argon, water vapor, optionally impurities such as NOx and/or SOx, and a solid-particle concentration of between 0.01 and 100 $mg/m^3$, wherein the feed gas is at least partially dried upstream of a PSA unit in order to prevent the solid particles from caking in the PSA unit is provided.

17 Claims, 1 Drawing Sheet

FOREIGN PATENT DOCUMENTS

| | | |
|---|---|---|
| EP | 1023934 | 8/2000 |
| EP | 1095689 | 5/2001 |
| GB | 2278113 | 11/1994 |

OTHER PUBLICATIONS

Bonnot, K., et al., "Effects of Composition, Temperature and Purge on the Performance of the Cyclic Adsorption of $CO_2$, and $CH_4$ on Activated Carbon," Trans IChemE (Mar. 2006).

Li, Gang et al., "Capture of $CO_2$ from High Humidity Flue Gas by Vacuum Swing Adsorption With Zeolite 13X," Apr. 30, 2007, published Jan. 16, 2008, Springer Science+Business Media, LLC (2008).

Ruthven, Douglas M., et al., "Pressure Swing Adsorption," VCH Publishers, Inc., New York, NY (1994).

Yang, Ralph, "Gas Separation by Adsorption Processes," Butterworth Publishers (1987).

* cited by examiner

DUST-LADEN WET GAS TREATMENT

This application is a §371 of International PCT Application PCT/FR2009/051130, filed Jun. 15, 2009.

FIELD OF THE INVENTION

The present invention relates to a method for producing a $CO_2$-enriched gas from a feed gas comprising carbon dioxide ($CO_2$), at least one component selected from $H_2$, $N_2$, $CH_4$, CO, $O_2$ and argon, water vapour—optionally impurities such as NOx and/or SOx—and a solid-particle concentration of between 0.01 and 100 mg/m$^3$, characterized in that the feed gas is at least partially dried upstream of a PSA unit in order to prevent the solid particles from caking in the PSA unit.

BACKGROUND

Climate change is one of today's most serious environmental challenges. The increasing carbon dioxide concentration in the atmosphere is largely the cause of global warming. $CO_2$ of human origin is essentially emitted into the atmosphere by the combustion of fossil fuels in thermal power plants or is produced by cement plants or steel plants.

To combat the $CO_2$ emissions, one technology is designed to capture the $CO_2$ emitted during the combustion of carbon-containing fuels to transport it and/or to sequester it underground.

It should be observed that the capture of the $CO_2$ from a stream also containing nitrogen, oxygen, argon, hydrogen, methane and/or carbon monoxide, causes the stream to be enriched with these products. The $CO_2$-depleted stream can then be used in a neighbouring process or can be recycled to the process that produced it. The method for producing a $CO_2$-enriched gas can therefore also be seen as a method for deballasting $CO_2$ from the gas to be treated. These two automatically linked functions can be exploited simultaneously. For example, recycling the $CO_2$-deballasted gas to the blast furnace serves to utilize the CO and the hydrogen while the $CO_2$-rich fraction can be sequestered.

In all cases, the $CO_2$ problem will require extracting at least part of the $CO_2$ contained in various gases produced by industry. Many methods will be used to capture this $CO_2$. One of the methods is adsorption. The $CO_2$ can be trapped at high temperature, that is above 150° C., or, on the contrary, at about ambient temperature, the $CO_2$-containing gas then preferably being at a temperature below 60° C.

The adsorption unit may be of the PSA type.

When regeneration takes place by lowering the pressure, this involves a PSA (Pressure Swing Adsorption) process; PSA process means actual PSA processes, that is with the adsorption phase taking place at a pressure substantially higher than atmospheric pressure, VSA (Vacuum Swing Adsorption) processes, in which the adsorption phase takes place at about atmospheric pressure with regeneration under vacuum, VPSA and similar processes (MPSA, MSA, etc.) with an adsorption phase taking place under a few bar and regeneration under vacuum. This category also includes systems which are regenerated by flushing with a purge gas, a gas which may be extraneous to the process itself. In this case, the partial pressure of the impurities is actually lowered, thereby allowing their desorption. The acronym PSA is used below for any one of these units.

PSA and VPSA units (that is with adsorption at medium pressure, generally between 2 and 10 bar abs, and regeneration under moderate vacuum, generally above 250 millibar absolute, preferably about 350 to 500 millibar absolute) have already been investigated extensively for various types of separation: production of high purity hydrogen, oxygen and/or nitrogen from air, methane from a $CH_4/CO_2$ mixture, CO from syngas, etc. These PSAs are constructed from well-known elementary steps: adsorption step, balancing steps, purge providing, blow-down, purge, repressurization, rinse.

These steps can be sequential or some may be simultaneous. One can for example consider the description of the cycles used in a number of PSA processes relative to various applications, cycles which can be easily adapted to at least partial capture of the $CO_2$:

EP 1 004 343 describes a cycle initially developed for $H_2$ PSA with two regeneration pressure levels, with 4 adsorbers and one balancing;

EP 1 095 689 describes a cycle with 2 adsorbers developed for the production of oxygen from air, a cycle comprising a repressurization with the unadsorbed gas, one balancing, a final repressurization with the feed gas, a production step, a blow-down step partly using a vacuum pump, and a purge phase;

U.S. Pat. No. 4,840,647 describes a cycle with 2 adsorbers, more particularly adapted to the capture of an easily adsorbable component such as $CO_2$;

EP 1 023 934 describes a $H_2$ PSA cycle with recycle of part of the low pressure waste gas to the gas to be treated;

U.S. Pat. No. 6,287,366 describes a $O_2$ VSA cycle illustrating the combined steps such as simultaneous blow-down via the 2 sides of the adsorber, repressurization with two different fluids, etc.

Most of the cycles described in the literature are directed towards the production of the least adsorbable gas or gases, the more adsorbable gases constituting the waste gas. This type of cycle can nevertheless be used to capture $CO_2$. In this case, the PSA is for example regulated to the $CO_2$ content in the light gases. In fact, producing a $CO_2$-enriched fraction at low pressure is equivalent to producing a $CO_2$-depleted fluid at the adsorption pressure.

US 2007/0261551 relative to $CH_4/CO_2$ separation provides an example of a $H_2$ PSA cycle with a high pressure adsorption phase, 2 balancings, one co-current blow-down with purge providing, a final blow-down, a low pressure purge step with the gas previously recovered and the product gas, and a final repressurization with the feed gas and the product gas.

This type of cycle can optionally be improved by the addition of steps more specific to the production of the most adsorbable gas, that is the $CO_2$ here. These additional steps are essentially steps of recycling part of the gas issuing from the blow-down, recycling to the feed or directly to another adsorber. In the latter case, this is referred to as a rinse step. Recycling to the feed generally consists in tapping off the least $CO_2$-rich fraction(s) of the gas issuing from the PSA from the counter-current blow-down or purge steps, in order to obtain a waste gas richer in $CO_2$. In this way, fewer of the lightest components (hydrogen, CO, methane, etc.) are obviously lost in the $CO_2$-enriched waste gas, and they can be used in another unit.

U.S. Pat. No. 4,077,779 describes a cycle with 4 or 6 adsorbers comprising the recycling of part of the blow-down gas to carry out a step of recycling to the feed or directly to another adsorber, as well as a purge step with a gas extraneous to the PSA. It is stated that this cycle can be used both for hydrogen production and for methane/$CO_2$ separation. The literature also describes cycles intended to extract CO from a syngas. In this case, the CO is the most easily adsorbable gas on an adsorbent that is specific to it. This type of cycle is directly transposable to the capture of the $CO_2$ contained in essentially less adsorbable gases after adsorbent replacement.

$CO_2$ sequestration is employed primarily on units producing large flows of $CO_2$-rich gas. Among them, mention can be made of the waste gases from carbon-containing fuel-fired electric power plants, in particular oxy-fuel combustion, cement plant gases, gases produced by steelmaking processes, or even syngases obtained by partial oxidation or steam reforming of carbon-containing fuels. In addition to their $CO_2$ content, these gases have the common feature of containing water vapour and dust. It is customary to remove most of these dust by methods well known to the profession: electrostatic filter, water scrubbing, venturi, cyclone, static cartridge or bag filter, dynamic filter regenerable in operation (by reverse gas flush-pulse), isolable filters mounted in parallel with the possibility of regeneration or replacement, the main unit remaining in service. Use is not made of a total filter—that is a medium that only allows elements having the size of gas molecules to pass through—and it is conventional that after filtration, these gases contain residual dust which raise no particular problem because generally vented to the air, burned or recycled without other treatment. More precisely, this generally involves gas streams containing less than 50 to 100 mg per $m^3$ of solid matter, even more generally less than 20 mg per $m^3$ (for greater clarity, $m^3$—here and below—means $m^3$ of gas relative to 0° C. and atmospheric pressure, although in the profession, it is often a matter of real $m^3$, for which the pressure and temperature conditions should be indicated every time).

The quantity of dust contained in the gas and the particle size distribution can be obtained by any one of the known methods which are not described here. Below, when speaking of particle size distribution, expressed in microns, reference is made to the main dimension of the particle (length for an elongate cylinder, diameter of the circumscribed sphere for an essentially spherical or cubic particle). The percentages indicated concern the number of particles having a particle size lower or higher than a given value.

It has appeared that the fine residual dust—that is after filtration or any primary trapping—which, in the absence of liquid water, can pass through the various components of the PSA unit without any particular problem, being easily transported by the gas, tends to cake and deposit in the presence of moisture. This has been observed and interpreted on an industrial unit successively having water saturation zones and water unsaturation zones due to the process employed. Deposits were systematically observed in the presence of saturation, whereas there was no accumulation of dust in the non-condensation zone. Due to the presence of filters, it was found that the quantity of particles per $m^3$ or the particle size distribution was not the predominant factor for the presence or absence of deposits, but clearly the presence of moisture (liquid water).

In fact, when such a gas, that is to say simultaneously containing water vapour, dust and a large quantity of $CO_2$, is treated by an adsorption unit, in particular in a PSA, it undergoes strong thermal effects due to the adsorption-desorption of the $CO_2$. Although the gas enters the adsorber at ambient temperature and at—or above—its condensation point, cold spots are created in the adsorber during the generation steps with passage below the water condensation point.

It is clear that these problems are aggravated by the fact that, in each cycle, there may be periods of condensation with caking of the fines followed by periods of drying, for example in the adsorption phase, which thereby cause the successive dust deposits to adhere to their support.

These caked deposits can ultimately cover the adsorbent particles or at least block their pores, clog the various instrumentation connections, dwell in the essential equipment, including the valves in particular. A loss of tightness of the latter causes poor operation of the PSA, particularly a drop in performance or even a blockage of the system. The same applies if the adsorbent is partly damaged.

In the case of $CO_2$ VSA, the thermal effects may be less severe in the adsorbent beds themselves due to the weaker pressure effect than in a PSA, but condensation is probable in the vacuum pump if the $CO_2$-rich gas is repressurized.

On this subject, the document of Gang Li et al, "Capture of $CO_2$ from high humidity flue gas by vacuum swing adsorption with zeolite 13X", Adsorption (2008) 14: 415-422, addresses the problem of the creation of cold spots, and of water condensation in the vacuum pump.

In fact, when a PSA unit is used, it is common to treat the wet gas directly in said unit without prior drying. Various specific adsorbents for stopping the water can be used for this purpose.

For example, the document by Ralph Yang, "Gas separation by adsorption processes", Butterworth Publishers 1987, teaches in particular that water vapour is adsorbed very strongly on zeolites and raises serious problems when zeolites have to be used to carry out a separation such as the separation of air gases, so that the tendency is to use silica gel or activated alumina to stop the water, and to integrate this stripping with the main stripping that uses zeolite. This naturally gives rise to the use of multibeds in the same adsorber, each layer of adsorbent being dedicated to stopping an impurity.

Similarly, $N_2$ PSA, $H_2$ PSA and PSAs supplying instrument air directly treat a wet feed gas. This is also the case of PSAs producing $CO_2$ and simultaneously hydrogen relatively similar to the PSAs mentioned here. On this subject, details can be found in Douglas Ruthven et al., "Pressure Swing Adsorption", which teaches that the water is stopped by a first series of adsorbent beds.

In general, without any specific problem such as dust, a person skilled in the art will not install TSA and PSA adsorption units in series, but will adapt his process and the adsorbents to carry out the intended separation in a single PSA unit. In particular, the problem of the presence of water in the feed gas is well known and PSA type solutions operating under such conditions are also well known today, as shown in the various examples given above.

To remedy the problems of dust deposition in the presence of water, a total filtration can be installed upstream of the PSA unit. In case of very large throughputs, generally at low pressure, the filtration surface area to be installed must be enormous and the same applies to the investment.

As an alternative, the scrubbing techniques and the number of scrubbing stages can be improved to remove all of the residual dust or at least to obtain residual contents which are sufficiently low for their caking during one or more years in or on the equipment to incur no drawback. A simple calculation of the quantities of dust entering the system, considering the large treated throughputs mentioned above—leads to acceptable residual values lower than about 10 mg per $Nm^3$ of gas to be treated, preferably about one microgram per $Nm^3$. These two techniques can be used in series. The direct costs (investment) and indirect costs (pressure drop on the gas, pumping energy, etc.) then become very high.

Another solution is to operate the adsorption unit at a sufficiently high temperature to remain above the condensation point in all circumstances, both in the adsorber and in the ancillaries. With the conventional adsorbents mentioned above, the adsorption capacity is reduced too much by raising the temperature, and such units would not be efficient. Vacuum pumping of hot gas would also be very costly in terms of investment and energy. These solutions are nevertheless under investigation but are not conclusive for the time being.

On this basis, a problem that arises is to propose a method for producing a $CO_2$-enriched gas employing a PSA unit, in which the caking of the solid particles in the PSA unit is reduced.

SUMMARY OF THE INVENTION

One solution of the invention is a method for producing a $CO_2$-enriched gas from a feed gas comprising 10 to 75 mol % carbon dioxide ($CO_2$), water vapour, at least one component selected from hydrogen, CO, methane, nitrogen, oxygen, argon, and solid particles, employing a PSA unit, characterized in that the feed gas is at least partially dried upstream of the PSA unit and enters said PSA unit with a solid-particle concentration of between 0.01 and 100 mg/m$^3$.

Note on this subject that when speaking of "drying" the gas to be treated, this means removing at least part of the water that it contains and not only raising the temperature in order to desaturate it.

Particles mean solid-state organic or inorganic components in the pressure and temperature conditions of the gas to be treated. These particles may be fragments of base materials used in the upstream process and which have not reacted (for example, coal dust) or entrained reaction products. They may contain metals, particularly heavy metals. They may consist of soot. They are generally referred to as "dust".

As required, the inventive method may have one of the following features:
  the feed gas further contains at least one impurity from nitrogen oxides (NOx) including nitric oxide and nitrogen dioxide, and sulphur oxides (SOx) including sulphur dioxide;
  the solid-particle concentration of the feed gas entering said PSA unit is between 0.1 and 50 mg/m$^3$, preferably between 1 and 20 mg/m$^3$;
  most of the solid particles have a particle size lower than 20 microns, more generally lower than 5 microns; majority means at least 50% is number of the solid particles;
  at least 10% by weight of the particles contained in the gas to be treated have a particle size lower than 1 micron;
  the feed gas is at least partially dried to obtain a relative humidity equal to or lower than 50%, preferably lower than 10%;
  the feed gas is at least partially dried to obtain a water content lower than 10 molar ppm, preferably lower than 1 molar ppm;
  the feed gas is dried by passage through a TSA adsorption unit;
  the TSA adsorption unit comprises one or more adsorbents selected from a 3A molecular sieve, undoped activated alumina and silica gel;
  the dried feed gas is pressurized upstream of the PSA unit;
  the PSA unit has a first layer of adsorbent selected from activated aluminas, silica gels and activated carbon;
  the feed gas is pressurized before being dried; said pressurization may be at least partially adiabatic, that is, without systematic cooling of the pressurized gas in each compression stage. However, the pressurized gas may be cooled and the condensed water is preferably separated from the stream sent to the dryer;
  the feed gas is a waste gas from a fuel-fired electric power plant, a cement plant gas, a syngas or a gas produced by a steelmaking process.

TSA (Temperature Swing Adsorption) unit means a unit using a temperature increase to desorb the water trapped during the adsorption step.

In the TSA unit, adsorbents trapping little or no $CO_2$ are preferably used, for example 3A sieve, undoped activated alumina, silica gel. Regeneration can take place at a pressure equal to or close to the adsorption pressure if necessary, to avoid depressurization or desorption effects. If necessary, thermal insulation internal or external to the adsorber can also be used to prevent heat losses.

This unit is designed so that there is no subsequent water condensation in the $CO_2$ PSA unit and, if necessary, in the supplementary unit or units for treating the $CO_2$-rich gas issuing from the $CO_2$ PSA, for example in compressors.

Note that in a number of cases, partial drying by cold spot with a heat exchanger/water separator system may be sufficient to prevent water condensation in the PSA unit and/or the associated equipment. This is the case for example for PSAs operating with limited pressure ratios (or pressure differences) between adsorption and regeneration, for example with an adsorption pressure lower than 10 bar absolute and a regeneration at about atmospheric pressure. An adsorbent having a limited $CO_2$ adsorption capacity, for example silica gel, may be less likely to cause the appearance of cold spots than a zeolite adsorbent.

Partial drying may also be sufficient if the $CO_2$-rich gas produced by the PSA is not repressurized and cooled below its water saturation point. Drying by cold spot means cooling the gas to be treated from a temperature T1, for example 40° C., to a substantially colder temperature T2, for example 8° C., removing the condensed water and heating the gas to a temperature close to its initial temperature T1, for example 35° C. here, or at least substantially higher than T2, for example up to 20° C. In this type of drying process by cold spot, the components of said dryer (heat exchanger, water/gas separator) may be equipped with a built-in scrubbing system to prevent any clogging due to the simultaneous presence of liquid and solid particles.

As mentioned above, in most cases, the feed gas throughput is very high—several hundred thousand Nm$^3$/h—and it would be normal to use a plurality of adsorbers in parallel for the adsorption step. This process is now conventionally used for H$_2$ PSA which may have up to four or five adsorption steps, and can be transposed without any problem to $CO_2$ PSA, which can therefore have a plurality of adsorbers simultaneously in the adsorption phase.

The adsorbers may also be clustered, for example clusters of 2, 3 or 4 adsorbers, which then operate in parallel. In this way, a $CO_2$ PSA cycle that comprises six phases and could thus operate with six very large adsorbers would in practice consist of 12 or 18 smaller adsorbers. These two alternatives for treating large throughputs may be complementary: two clusters of two adsorbers can for example be simultaneously in the adsorption phase.

In the same way as the H$_2$ PSA can operate in what is called degraded mode, that is with a smaller number of adsorbers, degraded operating modes can be easily developed for $CO_2$ PSA in order to operate in case of problems on one or more adsorbers (generally valve problems). In general, steps such as balancing or recycling are eliminated, making it possible to operate by meeting the main requirements—for example purity—with lower efficiency.

If the $CO_2$ PSA cycles can be similar to the cycles already used, in particular similar to the H$_2$ PSA cycles, the $CO_2$ PSA adsorbents must be adapted to this process. They generally comprise several successive layers of adsorbents having different properties. The majority adsorbent is generally silica gel (40 to 80% by volume). The characteristic properties of this adsorbent are as follows: Chemical composition: $SiO_2$>96 wt %, $Al_2O_3$<4 wt %, Specific surface area (BET): 550/775 m$^2$/g, Internal pore volume: 0.3/0.5 ml/g, Bulk bed density: 550/800 kg/m$^3$. In particular, one example is Sorbead LE-32 silica gel from BASF recommended for this application in the sales brochure, and whose average properties are: Chemical composition: $SiO_2$ approx 99.5 wt %, $Al_2O_3$ approx 0.5 wt %, Specific surface area (BET): 750 m$^2$/g, Internal pore volume: 0.45 ml/g, Bulk bed density: 600 kg/m$^3$.

Depending on the impurities present in the feed gas, the operating conditions and the performanc targets, particularly the $CO_2$ content in the pressurized product gas and the $CO_2$ purity in the offgas, various adsorbent layers are used before and after this bed of silica gel: activated alumina and/or doped activated alumina, silica gel having different properties from those of the main bed, such as silica gel designed to withstand the presence of liquid water such as Sorbead WS from BASF, highly activated (chemically or with steam) activated carbon, that is characterized by a large pore volume (>0.6 ml/g), a large average pore size (>15 ångströms) and/or a low density (<450 kg/m$^3$).

The upper layers, that is in the adsorption direction, following the main silica gel bed, may consist of denser activated carbon (density >450 kg/m$^3$), such as NORIT RB, and/or an A, Y or X (or LSX) type zeolite such as the commercial products from UOP (NaY, 13X HP, APG, APG II, APG III, etc.), from CECA (G5, G5DC, G5CO2M, G5CO2MLZ, G5CO2 LZ, etc.), from Zeochem (Z10-02, Z 10-02 ND, etc.), from Grace Davison (Sylobead MS C, etc.), from CWK etc.

These same commercially available adsorbents—activated carbons of various origins and more or less activated, alumina, silica gel of variable porosity, A, Y, X type zeolites, optionally exchanged—can be defined through many other properties relative to their capacity to adsorb the various gases involved, their heat transfer properties, all within standard conditions or operating conditions. It is not the object of the present application to illustrate this type of data here.

The same applies to the kinetics of these adsorbents, which may be defined by various laboratory measurements, and then, for example, related to the PSA $CO_2$ cycle time. In practice, for the products mentioned and the industrial size of the particles employed, the kinetics is controlled by the size of the adsorbent particles, and a person skilled in the art will adapt the diameter of the beads or the equivalent diameter of the particles to the method selected. The equivalent diameter is generally between 1 and 4 mm.

For each of the cycles that can be used, a large number of optimization parameters still exists, such as the choice of the duration of the steps, the choice of certain cutoff pressures (example: balancing end and blow-down start pressure). These optimizations can now be made by means of adsorption simulators. These simulators are available in the market, but many companies use tools developed in-house. A description of such a simulator can be found in <<Trans IChemE, Part A, Chemical Engineering Research and Design, 2006, 84(A3): 192-208.

These simulators can be coupled to an optimization engine that modifies a number of parameters left free (for example, treated throughput, intermediate pressure, phase time, etc.) with various requirements (for example, purity, etc.) in order to optimize a parameter ($CO_2$ extraction yield, for example) or a function (specific energy of separation, for example).

The duration of the adsorption step is generally between 30 seconds and 3 minutes. The duration of an adsorption phase accordingly depends on the total number of adsorption phases of the cycle considered. For example, a $CO_2$ PSA having a phase time of 45 seconds and two successive adsorption steps will have a total adsorption time of 90 seconds.

DETAILED DESCRIPTION OF THE INVENTION

For a further understanding of the nature and objects for the present invention, reference should be made to the detailed description, taken in conjunction with the accompanying drawing, in which like elements are given the same or analogous reference numbers and wherein:

The invention will now be described in greater detail in conjunction with FIGS. 1 to 3.

Figure 1:
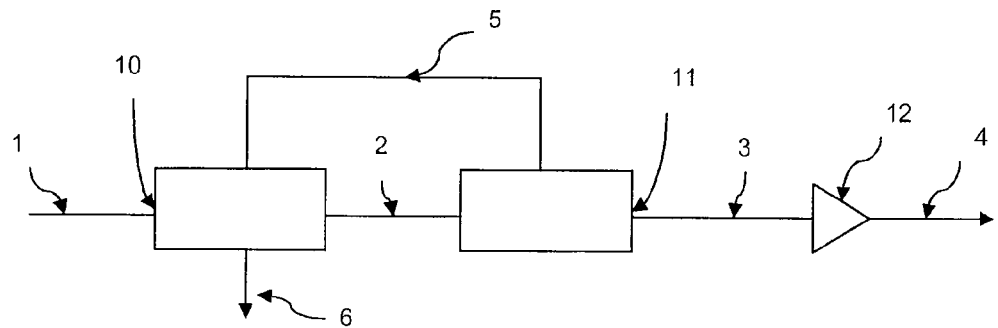
FIG. 1 illustrates one embodiment of the present invention.
Figure 2:
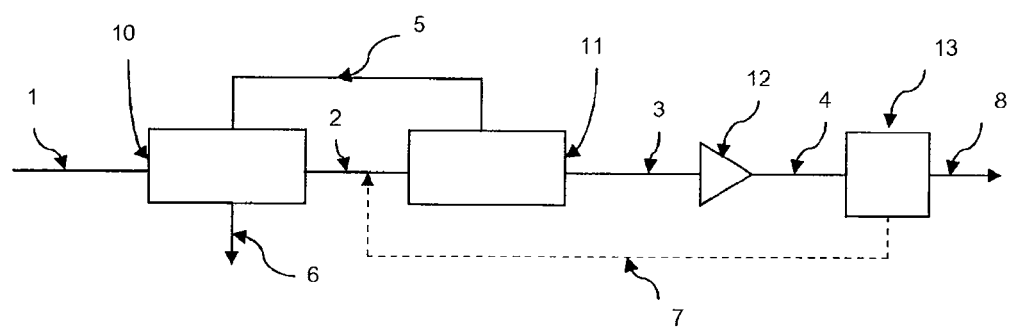
FIG. 2 illustrates one embodiment of the present invention.

FIG. 1 shows a simple method in which the PSA $CO_2$ unit (11) directly produces a $CO_2$-enriched fraction that is sufficiently enriched to be pressurized by the machine (12) and to produce a directly usable fraction (4). The gas to be treated (1) is dried in the TSA (10) and it is the dried fraction (2) which is fed to the PSA. The $CO_2$-depleted fraction issuing from the PSA (5) is used to regenerate the TSA. Alternatively, the regeneration can be carried out with nitrogen available on the site or any other sufficiently dry gas whose subsequent use is not compromised by the presence of water. The $CO_2$ content in the gas to be treated is generally fairly high, for example between 40 and 75 mol %.

In the presence of the TSA, a fraction of the particles, those with the largest particle size, is stopped in the adsorbent bed and then entrained by the regeneration gas. This fraction is generally recycled or burned. The fraction corresponding to the dust particles enters the PSA. Most of it generally leaves with the waste gas, that is with the $CO_2$-rich gas. There is no deposition in the equipment and the units can operate without any particular problem.

In the absence of the TSA, the moisture in the feed gas is trapped in the first adsorbent layers and is then found in the $CO_2$-rich fraction. Condensation may occur depending on the PSA method employed in the adsorbent, in the lower part of the adsorber and/or during the pressurization. These are all places where the particles are liable to be trapped, to cake together and to form deposits. FIG. 2 shows the addition of a cold box (13) intended to improve the $CO_2$ content before its use (8). The waste from the cold box (7) is optionally recycled to the inlet of the PSA $CO_2$.

The purpose of the cold box is to preferably condense the $CO_2$, as the other gases present, including nitrogen, oxygen, argon, hydrogen, methane and carbon monoxide, are "lighter" than carbon dioxide. The liquid obtained (or the corresponding gas stream if the $CO_2$ is vaporized) is then substantially richer in $CO_2$ than the fluid thus treated. The $CO_2$ content of the feed gas is generally between 25 and 70 mol %. The above remarks on particle deposition apply here also.

Figure 3:
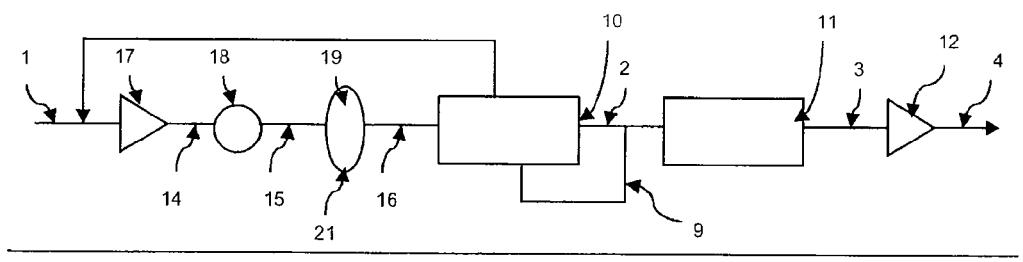
FIG. 3 illustrates one embodiment of the present invention.

FIG. 3 shows an alternative of the method in FIG. 1, in which the gas to be treated (1) must be pressurized (17) before being dried (10). A final refrigeration (18) is provided with a separation of the condensed water (21) in the gas/liquid separator (19). A scrubbing system may be provided at the separator (19) and optionally at the cooler (18) or the compressor (17). Since the water condensation is controlled, that is, it is known to take place in the heat exchanger, it is obviously possible to take effective countermeasures such as water injection, continuous or intermittent. It is clear that such solutions are inapplicable when deposits take place in the adsorbent or carpet wide areas of equipment (adsorber ends, valves, etc.). Note also that the cold spot of a PSA depends on the operating conditions, which may change fairly regularly. The same applies to the location of the deposit. The dryer is regenerated here by a fraction (9) of the dried feed gas (2). This gas can then be reinjected at the compressor intake, generally after cooling and condensation of the water present.

In each of these cases, the drying unit (10) may comprise 2 adsorbers, one in the adsorption phase and one in the regeneration phase (heating then cooling).

More complex cycles with a larger number of cylinders can obviously be used. In general, one or more adsorbent layers may be present, selected from activated aluminas, silica gels, activated carbon, zeolites, particularly a 3A type zeolite.

The PSA unit (11) may also comprise several layers. Preferably, the first layer or layers consist(s) of adsorbents selected from the group consisting of activated aluminas, silica gels and activated carbon. A subsequent layer may comprise zeolites or MOF (metal organic frame).

The adsorption pressure of the TSA is preferably between 1.5 and 30 bar abs; and the pressure of the PSA (or VSA) unit is preferably between 1.3 and 30 bar abs.

The dried gas may optionally be pressurized before the PSA unit.

The adsorbers of the TSA and/or of the PSA may be cylindrical with a vertical axis, or a horizontal axis, or preferably radial for treating high throughputs (for example higher than 150 000 $Nm^3/h$).

Note that depending on the adsorbents used, the TSA unit intended to dry the gas to be treated upstream of the PSA may intentionally or inadvertently stop other components present in the type of gas treated. In fact, it is known that the gases produced by combustion or metallurgical processes can in fact contain many components in trace amounts.

Note also that the fact of drying the feed gas upstream of the PSA unit can serve to limit the wear of the stainless steel or other costly materials in favour of the use of plain carbon steel. In fact, the condensation water saturated with $CO_2$ and/or NOx and SOx may be highly corrosive. The presence of oxygen generally aggravates this corrosion. The additional cost of the dryer can thus at least partly be offset by savings on materials.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is

1. A method for producing a $CO_2$-enriched gas from a feed gas comprising 10 to 75 mol % carbon dioxide, water vapor, solid particles and at least one component selected from the group consisting of hydrogen, CO, methane, nitrogen, oxygen, and argon; said method employing a PSA unit, wherein the feed gas is at least partially dried upstream of the PSA unit, to obtain a relative humidity lower than 10%, and wherein said feed gas enters said PSA unit with a solid-particle concentration of between 0.01 and 100 $mg/m^3$.

2. The method of claim 1, wherein the feed gas further contains at least one impurity from nitrogen oxides, and sulfur oxides.

3. The method of claim 2, wherein said nitrogen oxides are either nitric oxide or nitrogen dioxide.

4. The method of claim 2, wherein said sulfur oxides comprise sulfur dioxide.

5. The method of claim 1, wherein the solid-particle concentration of the feed gas entering said PSA unit is between 0.1 and 50 $mg/m^3$.

6. The method of claim 5, wherein said solid-particle concentration of the feed gas entering said PSA unit is between 1 and 20 $mg/m^3$.

7. The method of claim 1, wherein most of the solid particles have a particle size lower than 20 microns.

8. The method of claim 7, wherein most of the solid particles have a particle size lower than 5 microns.

9. The method of claim 1, wherein at least 10% of the particles contained in the gas to be treated have a particle size lower than 1 micron.

10. The method of claim 1, wherein the feed gas is at least partially dried to obtain a water content lower than 10 molar ppm.

11. The method of claim 10, wherein the feed gas is at least partially dried to obtain a water content lower than 1 molar ppm.

12. The method of claim 1, wherein the feed gas is dried by passage through a TSA adsorption unit.

13. The method of claim 12, wherein the TSA adsorption unit comprises one or more adsorbents selected from the group of a 3A molecular sieve, undoped activated alumina and silica gel.

14. The method of claim 1, wherein the dried feed gas is pressurized upstream of the PSA unit.

15. The method of claim 1, wherein the PSA unit has a first layer of adsorbent selected from the group consisting of activated aluminas, silica gels and activated carbon.

16. The method of claim 1, wherein the feed gas is pressurized before being dried.

17. The method of claim 1, wherein the feed gas is a waste gas from a fuel-fired electric power plant, a cement plant gas, a syngas or a gas produced by a steelmaking process.

* * * * *